United States Patent
Koike et al.

(10) Patent No.: US 10,564,784 B2
(45) Date of Patent: *Feb. 18, 2020

(54) CAPACITIVE SENSOR HAVING BENDING PORTION AND FLAT PORTION

(71) Applicant: Alps Alpine Co., Ltd., Tokyo (JP)

(72) Inventors: Yusuke Koike, Niigata-ken (JP); Kiyoshi Kobayashi, Niigata-ken (JP); Hideaki Takahashi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 15/945,591

(22) Filed: Apr. 4, 2018

(65) Prior Publication Data

US 2018/0224975 A1 Aug. 9, 2018

Related U.S. Application Data

(63) Continuation of application No. PCT/JP2016/086535, filed on Dec. 8, 2016.

(30) Foreign Application Priority Data

Dec. 11, 2015 (JP) ................................. 2015-242043

(51) Int. Cl.
*G06F 3/044* (2006.01)
*G01B 7/16* (2006.01)

(52) U.S. Cl.
CPC .............. *G06F 3/044* (2013.01); *G01B 7/22* (2013.01); *G06F 2203/04102* (2013.01); *G06F 2203/04111* (2013.01)

(58) Field of Classification Search
CPC ..................................................... G06F 3/044
(Continued)

(56) References Cited

U.S. PATENT DOCUMENTS 8,717,330 B2 * 5/2014 Lu ........................... G06F 3/044
174/254
10,001,888 B2 * 6/2018 Hong .................... G06F 3/0412
(Continued)

FOREIGN PATENT DOCUMENTS

JP        2015-49847       3/2015
KR    10-2012-0038130       4/2012
(Continued)

OTHER PUBLICATIONS

International Search Report from International Application No. PCT/JP2016/086535 dated Feb. 7, 2017.
(Continued)

*Primary Examiner* — Chad M Dicke
(74) *Attorney, Agent, or Firm* — Beyer Law Group LLP

(57) ABSTRACT

A capacitive sensor having a bending portion and a flat portion and bendable in the bending portion includes a plurality of first transparent electrodes, a plurality of second transparent electrodes, a coupling member, and a bridge wiring member. The first transparent electrodes are arranged in a first direction. The second transparent electrodes are arranged in a second direction crossing the first direction. The coupling member is provided integrally with either the first transparent electrodes or the second transparent electrodes. The bridge wiring member is provided separately from the first transparent electrodes or the second transparent electrodes, to which the coupling member is not provided, in a portion where the bridge wiring member crosses the coupling member. A direction in which the coupling member extends in the bending portion is different from a direction in which the coupling member extends in the flat portion.

5 Claims, 13 Drawing Sheets

(58) Field of Classification Search
USPC .................................... 345/174; 178/18.06
See application file for complete search history.

(56) References Cited

U.S. PATENT DOCUMENTS

| | | | | |
|---|---|---|---|---|
| 10,048,821 | B2* | 8/2018 | Kang | G06F 3/044 |
| 10,120,447 | B2* | 11/2018 | Peshkin | G06F 3/016 |
| 2011/0157086 | A1* | 6/2011 | Ozeki | G06F 3/044 345/174 |
| 2011/0234512 | A1 | 9/2011 | Kim et al. | |
| 2013/0307816 | A1* | 11/2013 | Lee | G06F 1/1652 345/174 |
| 2014/0001024 | A1* | 1/2014 | Liao | G06F 3/044 200/600 |
| 2014/0042406 | A1 | 2/2014 | Degner et al. | |
| 2014/0071065 | A1 | 3/2014 | Kung et al. | |
| 2014/0132553 | A1 | 5/2014 | Park et al. | |
| 2014/0204050 | A1* | 7/2014 | Huang | G06F 3/044 345/174 |
| 2014/0218631 | A1 | 8/2014 | Kang et al. | |
| 2015/0070312 | A1 | 3/2015 | Her et al. | |
| 2015/0241924 | A1 | 8/2015 | Chang et al. | |
| 2015/0293629 | A1* | 10/2015 | Ryu | G06F 3/044 345/174 |
| 2015/0346776 | A1* | 12/2015 | Miyake | G06F 1/1652 345/174 |
| 2015/0362960 | A1 | 12/2015 | Chang et al. | |
| 2016/0170523 | A1 | 6/2016 | Park et al. | |
| 2018/0225000 | A1* | 8/2018 | Kim | G06F 3/044 |
| 2019/0019845 | A1* | 1/2019 | Jeong | H01L 51/5256 |

FOREIGN PATENT DOCUMENTS

| | | |
|---|---|---|
| TW | M500924 | 5/2015 |
| WO | WO2010/029979 | 3/2010 |

OTHER PUBLICATIONS

European Search Report from European Application No. 16873067 dated Jun. 26, 2019.

* cited by examiner

CAPACITIVE SENSOR HAVING BENDING PORTION AND FLAT PORTION

CLAIM OF PRIORITY

This application is a Continuation of International Application No. PCT/JP2016/086535 filed on Dec. 8, 2016, which claims benefit of Japanese Patent Application No. 2015-242043 filed on Dec. 11, 2015. The entire contents of each application noted above are hereby incorporated by reference.

BACKGROUND OF THE INVENTION

1. Field of the Invention

The present invention relates to a capacitive sensor and relates specifically to a capacitive sensor that has a bridge structure (electrode-crossing structure) and that is bendable.

2. Description of the Related Art

A typical capacitive sensor includes a plurality of transparent electrodes having light transparency. In such a capacitive sensor, which has a bridge structure, a plurality of first transparent electrodes are coupled to each other in a first direction via bridge wires, and a plurality of second transparent electrodes are coupled to each other in a second direction via coupling members. The plurality of bridge wires extend in the same direction throughout substantially the entire area in which the transparent electrodes are provided.

Japanese Unexamined Patent Application Publication No. 2015-49847 discloses an input device that includes a surface panel having a curved surface and a film sensor bonded to the surface panel with an adhesive therebetween. The film sensor described in Japanese Unexamined Patent Application Publication No. 2015-49847 is curved along the curved shape of the surface panel and bonded to the surface panel.

The film sensor curved along the curved shape is subjected to bending stress in a portion that is curved. In a case where a capacitive sensor is used for a terminal device having a display screen that is bendable (that is, a foldable terminal device), a bending portion is repeatedly subjected to bending stress. Then, damage, such as a crack, may occur in a bridge wire, and the resistance of the bridge wire may change accordingly, in which there is room for improvement. When the resistance of the bridge wire changes, the sensor function may be affected.

To reduce the possibility of damage, such as a crack, occurring in a bridge wire, the direction in which the bridge wires extend can be changed. However, in a case where the plurality of bridge wires extend in the same direction and the capacitive sensor is used for, for example, a terminal device as described above, the pattern of the bridge wires may be visible from outside the terminal device depending on the arrangement relationship between the capacitive sensor and the display.

SUMMARY OF THE INVENTION

The present invention has been made to address the above-described existing issues, and provides a capacitive sensor that is bendable and in which damage in the bridge structure can be suppressed and the possibility of the sensor function becoming defective can be reduced.

A capacitive sensor according to an aspect of the present invention is a capacitive sensor having a bending portion and a flat portion and bendable in the bending portion, including: a plurality of first transparent electrodes arranged side by side in a first direction in a detection area and having light transparency; a plurality of second transparent electrodes arranged side by side in a second direction crossing the first direction in the detection area and having light transparency; a coupling member provided integrally with either the plurality of first transparent electrodes or the plurality of second transparent electrodes to electrically connect the plurality of first transparent electrodes or the plurality of second transparent electrodes, to which the coupling member is provided, to each other; and a bridge wiring member provided separately from the plurality of first transparent electrodes or the plurality of second transparent electrodes, to which the coupling member is not provided, in a portion where the bridge wiring member crosses the coupling member, to electrically connect the plurality of first transparent electrodes or the plurality of second transparent electrodes, to which the bridge wiring member is provided, to each other. A direction in which the coupling member extends in the bending portion is different from a direction in which the coupling member extends in the flat portion.

When a capacitive sensor is bent, a bending portion of the capacitive sensor is subjected to bending stress. In a case where the capacitive sensor is used for, for example, a terminal device having a display screen that is bendable (that is, a foldable terminal device), the bending portion is repeatedly subjected to bending stress. Then, damage, such as a crack, may occur in a bridge wiring member, and the resistance of the bridge wiring member may change accordingly. When the resistance of the bridge wiring member changes, the sensor function of the capacitive sensor may be affected.

To address this issue, in the capacitive sensor described above, the direction in which the coupling member extends in the bending portion is different from the direction in which the coupling member extends in the flat portion. Therefore, the direction in which the bridge wiring member extends in the bending portion can be made different from the direction in which the bridge wiring member extends in the flat portion.

Accordingly, the bending resistance of the capacitive sensor can be increased. That is, even in a case where the capacitive sensor is bendable, the possibility of damage, such as a crack, occurring in the bridge wiring member can be reduced. As a result, changes in the resistance of the bridge wiring member can be suppressed, and the possibility of the sensor function of the capacitive sensor being affected can be reduced. The bending resistance of the capacitive sensor is increased, and therefore, the capacitive sensor can be bent with a smaller radius of curvature, and reliability can be increased.

In the capacitive sensor described above, the direction in which the coupling member extends in the bending portion may be orthogonal to the direction in which the coupling member extends in the flat portion. Accordingly, the direction in which the bridge wiring member extends in the bending portion can be made close to a direction orthogonal to the direction in which the bridge wiring member extends in the flat portion. As a result, even in the case where the capacitive sensor is bendable, the possibility of damage, such as a crack, occurring in the bridge wiring member can be further reduced.

In the capacitive sensor described above, a direction in which the bridge wiring member extends in the bending portion may cross a direction in which the bridge wiring member extends in the flat portion. Accordingly, the direction in which the bridge wiring member, which connects the plurality of first transparent electrodes to each other, extends in the bending portion can be made to cross the direction in which the bridge wiring member, which connects the plurality of first transparent electrodes to each other, extends in the flat portion. As a result, even in the case where the capacitive sensor is bendable, the possibility of damage, such as a crack, occurring in the bridge wiring member can be reduced, and the possibility of the sensor function of the capacitive sensor being affected can be reduced accordingly.

In the capacitive sensor described above, a direction in which the bridge wiring member extends in the bending portion may be orthogonal to a direction in which the bridge wiring member extends in the flat portion. Accordingly, the direction in which the bridge wiring member extends in the bending portion can be made orthogonal to the direction of bending stress to which the bending portion is subjected. As a result, even in the case where the capacitive sensor is bendable, the possibility of damage, such as a crack, occurring in the bridge wiring member can be reduced with more certainty, and the possibility of the sensor function of the capacitive sensor being affected can be reduced with more certainty accordingly.

In the capacitive sensor described above, in the flat portion, the coupling member may be provided to the plurality of second transparent electrodes, and the bridge wiring member may be provided to the plurality of first transparent electrodes, and in the bending portion, the coupling member may be provided to the plurality of first transparent electrodes, and the bridge wiring member may be provided to the plurality of second transparent electrodes. Accordingly, the possibility of damage, such as a crack, occurring in the bridge wiring member can be reduced without making the arrangement relation of the first transparent electrodes and the second transparent electrodes in the bending portion and that in the flat portion different from each other.

In the capacitive sensor described above, in both the flat portion and the bending portion, the coupling member may be provided to the plurality of second transparent electrodes, and the bridge wiring member may be provided to the plurality of first transparent electrodes. Accordingly, the connection relation of the plurality of first transparent electrodes being electrically connected to each other via the bridge wiring member and the connection relation of the plurality of second transparent electrodes being electrically connected to each other via the coupling member in the bending portion remain the same in the flat portion. The direction in which the coupling member extends and the direction in which the bridge wiring member extends in the bending portion can be made different from those in the flat portion. Therefore, the possibility of damage, such as a crack, occurring in the bridge wiring member can be reduced without making the connection relation of the plurality of first transparent electrodes and the connection relation of the plurality of second transparent electrodes in the bending portion and those in the flat portion different from each other.

In the capacitive sensor described above, the first transparent electrodes may have a rhombus shape, the first transparent electrodes in the bending portion may each have an extending portion extending outward from a portion of the rhombus shape, the bridge wiring member in the flat portion may be connected to an end portion of the rhombus shape and extend in the first direction, and the bridge wiring member in the bending portion may be connected to an end portion of the extending portion and extend in a direction crossing the first direction.

Accordingly, the connection relation of the plurality of first transparent electrodes being electrically connected to each other via the bridge wiring member and the connection relation of the plurality of second transparent electrodes being electrically connected to each other via the coupling member in the bending portion remain the same in the flat portion. The direction in which the bridge wiring member extends in the bending portion can be made to cross the direction of bending stress to which the bending portion is subjected. The bridge wiring member in the flat portion is connected to the end portion of the rhombus shape and extends in the first direction. As a result, even in a case where the capacitive sensor is used for, for example, a terminal device having a display screen, the possibility of the pattern of the bridge wiring member being visible from outside the terminal device can be reduced.

In the capacitive sensor described above, the first transparent electrodes may have a rhombus shape, the first transparent electrodes in the bending portion may each have an extending portion extending outward from a portion of the rhombus shape, the bridge wiring member in the flat portion may be connected to an end portion of the rhombus shape and extend in the first direction, and the bridge wiring member in the bending portion may be connected to an end portion of the extending portion and extend in a direction orthogonal to the first direction.

Accordingly, the connection relation of the plurality of first transparent electrodes being electrically connected to each other via the bridge wiring member and the connection relation of the plurality of second transparent electrodes being electrically connected to each other via the coupling member in the bending portion remain the same in the flat portion. The direction in which the bridge wiring member extends in the bending portion can be made orthogonal to the direction of bending stress to which the bending portion is subjected. The bridge wiring member in the flat portion is connected to the end portion of the rhombus shape and extends in the first direction. As a result, even in the case where the capacitive sensor is used for, for example, a terminal device having a display screen, the possibility of the pattern of the bridge wiring member being visible from outside the terminal device can be reduced with more certainty.

According to an aspect of the present invention, it is possible to provide a capacitive sensor that is bendable and in which damage in the bridge structure can be suppressed and the possibility of the sensor function becoming defective can be reduced.

DESCRIPTION OF THE PREFERRED EMBODIMENTS

Figure 1:
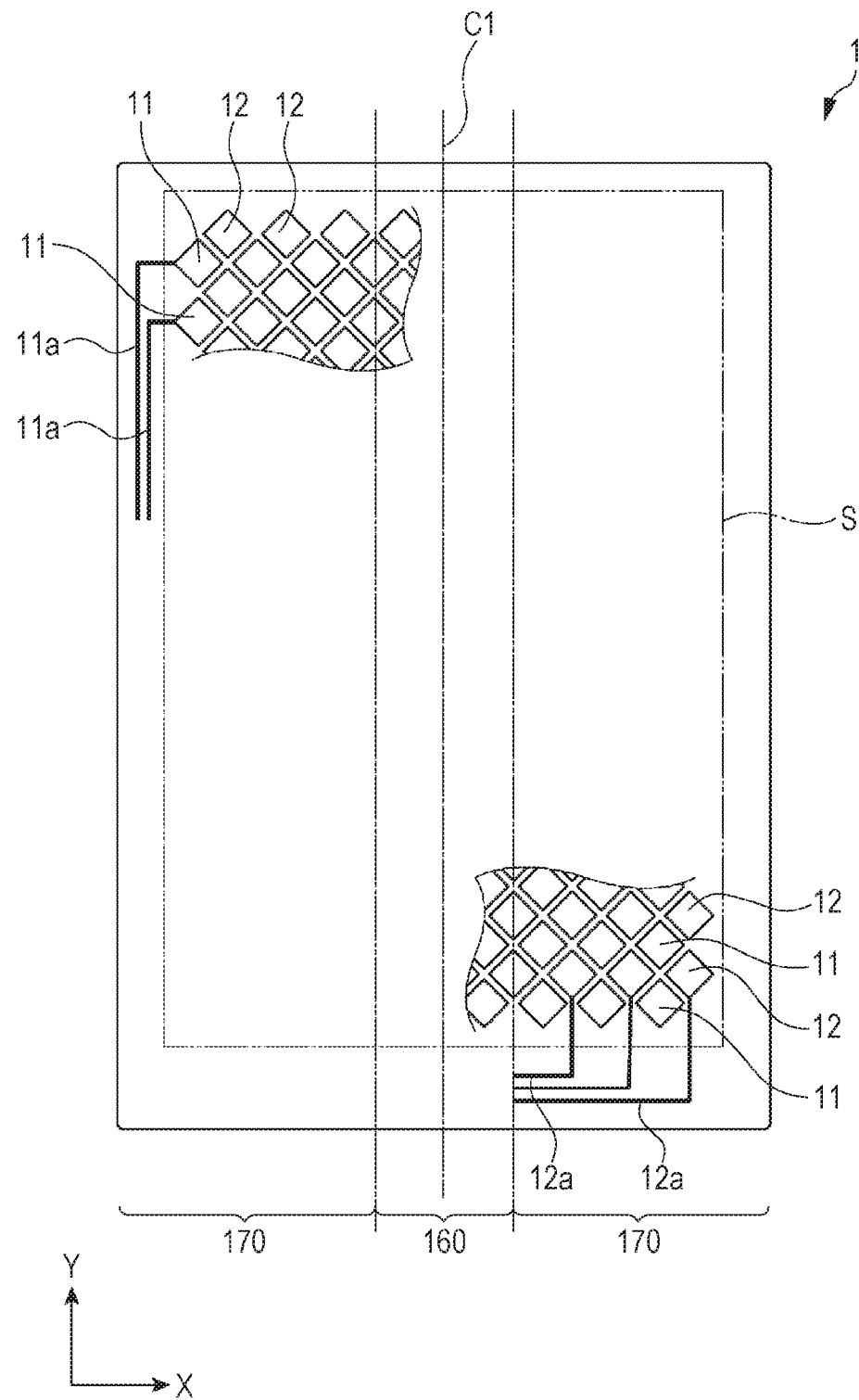
FIG. 1 is a schematic plan view illustrating a capacitive sensor according to the present embodiment.

Hereinafter, an embodiment of the present invention will be described with reference to the drawings. Note that, in the drawings, similar constituent elements are assigned the same reference numerals, and detailed descriptions thereof will be omitted as appropriate.

Figure 2:
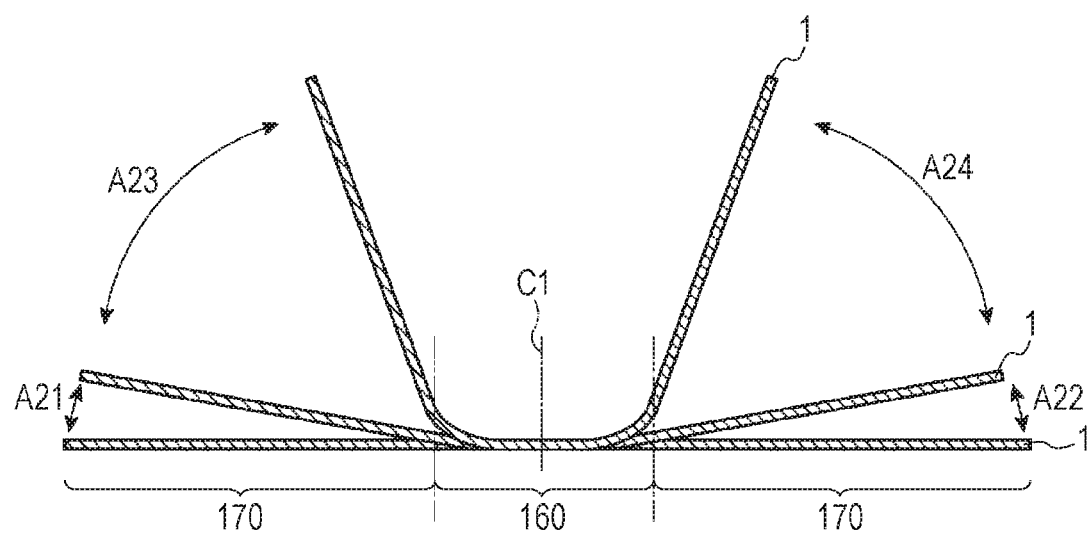
FIG. 2 is a schematic plan view illustrating a state where the capacitive sensor according to the present embodiment is bent.
Figure 3:
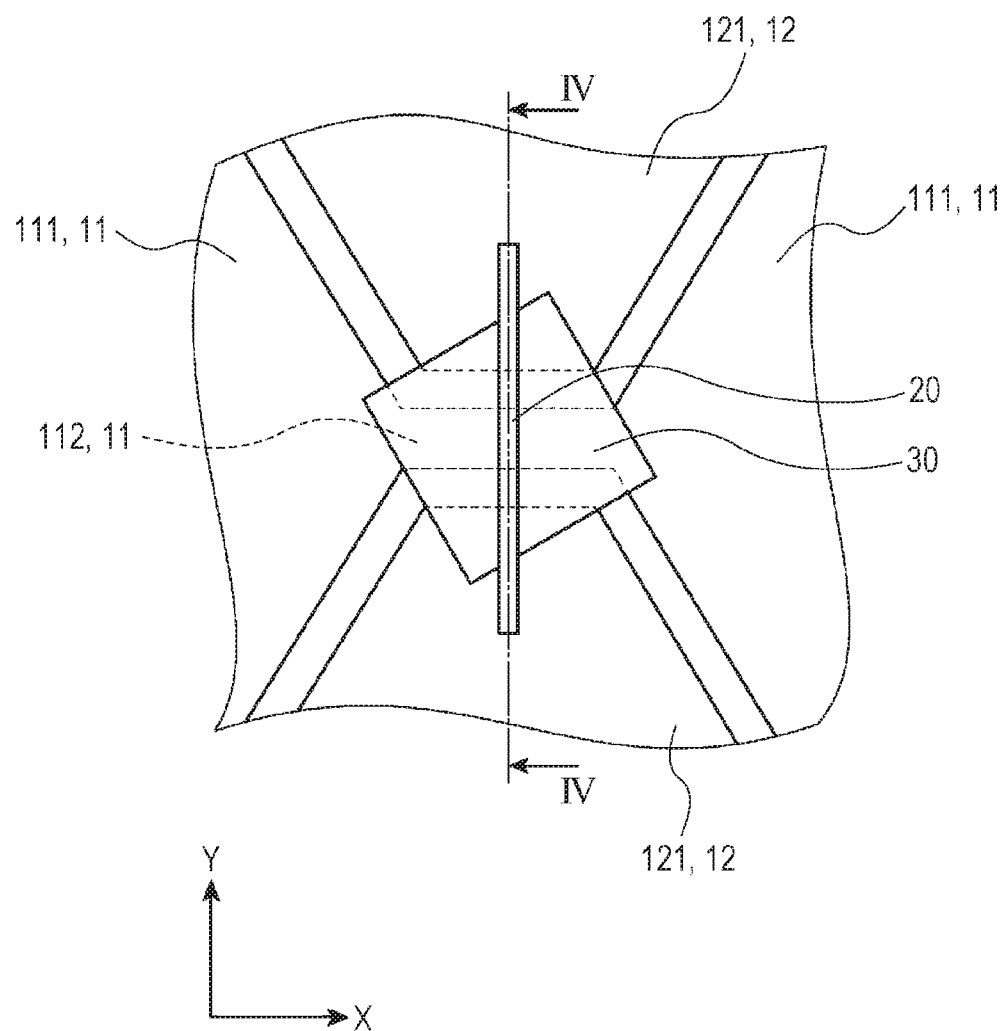
FIG. 3 is a schematic enlarged view illustrating a bridge wiring member in a bending portion.
Figure 4:
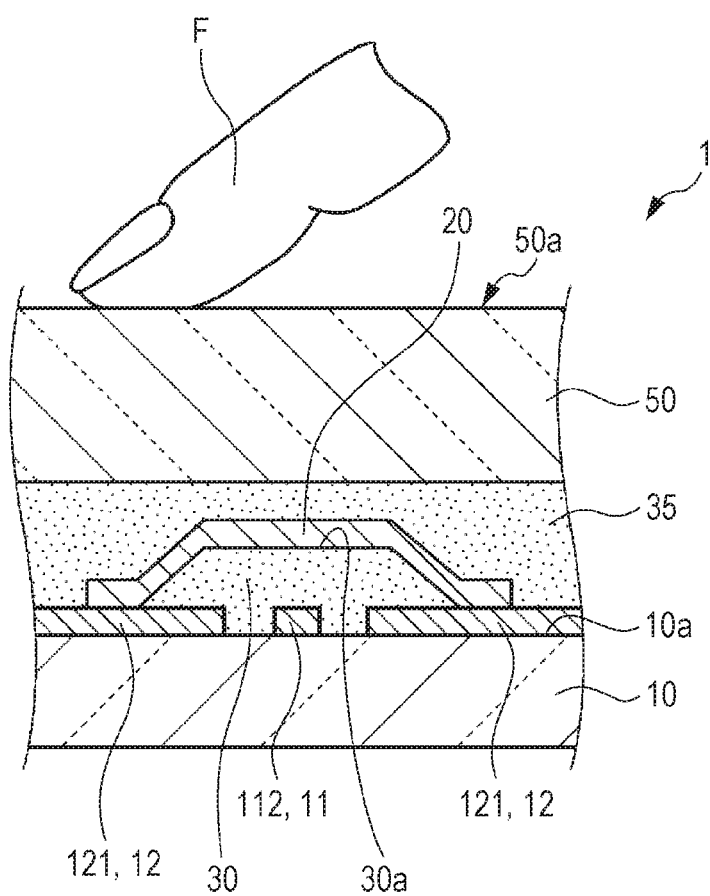
FIG. 4 is a schematic cross-sectional view taken along line IV-IV illustrated in FIG. 3.
Figure 5:
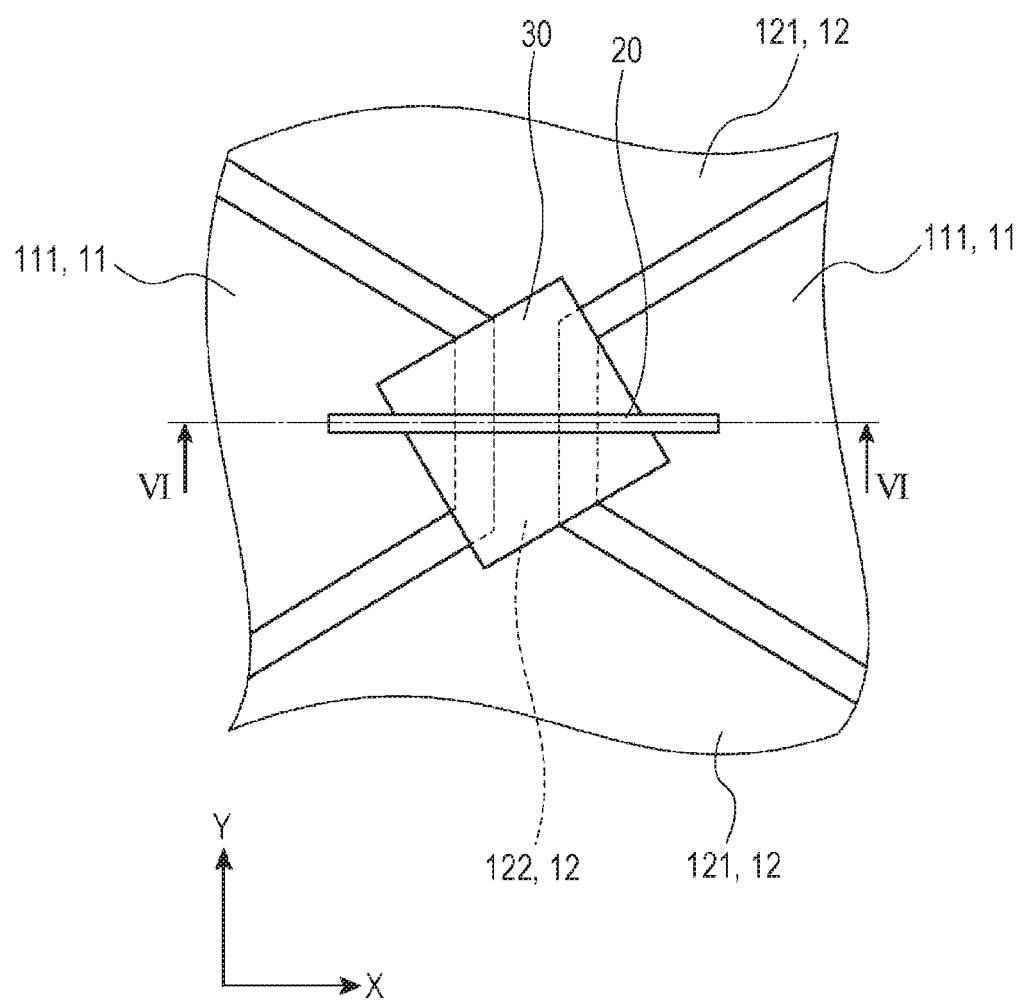
FIG. 5 is a schematic enlarged view illustrating a bridge wiring member in a flat portion.
Figure 6:
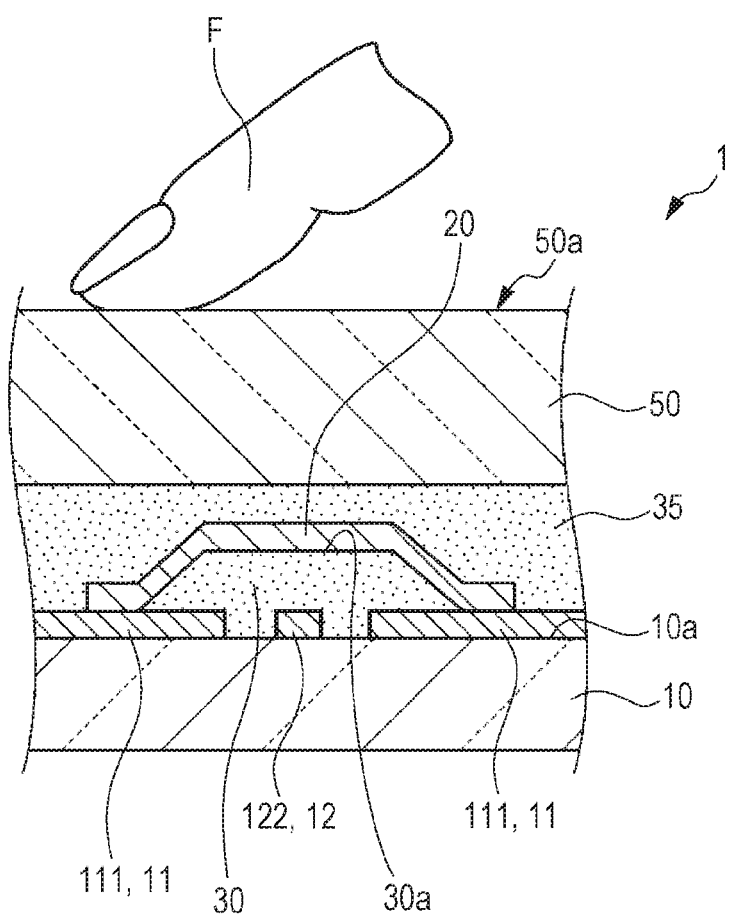
FIG. 6 is a schematic cross-sectional view taken along line VI-VI illustrated in FIG. 5.

FIG. 1 is a schematic plan view illustrating a capacitive sensor according to the present embodiment. FIG. 2 is a schematic plan view illustrating a state where the capacitive sensor according to the present embodiment is bent. FIG. 3 is a schematic enlarged view illustrating a bridge wiring member in a bending portion. FIG. 4 is a schematic cross-sectional view taken along line IV-IV illustrated in FIG. 3. FIG. 5 is a schematic enlarged view illustrating a bridge wiring member in a flat portion. FIG. 6 is a schematic cross-sectional view taken along line VI-VI illustrated in FIG. 5.

The terms "transparent" and "light transparency" used herein indicate a state where the visible-light transmittance is 50% or more (preferably, 80% or more). Further, it is preferable that the haze value be 6% or less.

As indicated by the arrows A21 to A24 illustrated in FIG. 2, a capacitive sensor 1 according to the present embodiment is bendable (specifically, foldable) along the axis C1 illustrated in FIG. 1 and FIG. 2, which is an approximate center. Therefore, the capacitive sensor 1 according to the present embodiment has a bending portion 160 and a flat portion 170, as illustrated in FIG. 1 and FIG. 2. The axis C1 is an axis of bending and corresponds to a bend line. The capacitive sensor 1 according to the present embodiment is used for, for example, a terminal device having a display screen that is bendable (that is, a foldable terminal device).

As illustrated in FIG. 1 and FIG. 3 to FIG. 6, the capacitive sensor 1 according to the present embodiment includes a substrate 10, first electrodes 11, second electrodes 12, bridge wiring members 20, an optical clear adhesive (OCA) layer 35, and a protective layer 50.

The substrate 10 has light transparency and is formed of, for example, a film-like transparent base made of polyethylene terephthalate (PET) or a glass base.

The first electrodes 11 and the second electrodes 12 are provided in a detection area S (an area in which operations using an operation device, such as a finger, can be performed) of the substrate 10. Each first electrode 11 extends in an X direction (first direction) along a surface 10a of the substrate 10. Each second electrode 12 extends in a Y direction (second direction) orthogonal to the X direction along the surface 10a of the substrate 10. The first electrodes 11 are isolated from the second electrodes 12. In the present embodiment, the plurality of first electrodes 11 are arranged in the Y direction at predetermined intervals, and the plurality of second electrodes 12 are arranged in the X direction at predetermined intervals.

As illustrated in FIG. 3 and FIG. 5, each first electrode 11 has a plurality of first transparent electrodes 111. In the present embodiment, the plurality of first transparent electrodes 111 have a shape close to a rhombus shape and are arranged side by side in the X direction. That is, the plurality of first transparent electrodes 111 are arranged side by side in the X direction. Each second electrode 12 has a plurality of second transparent electrodes 121. The plurality of second transparent electrodes 121 have a shape close to a rhombus shape and are arranged side by side in the Y direction. That is, the plurality of second transparent electrodes 121 are arranged side by side in the Y direction, which crosses the X direction.

The first transparent electrodes 111 and the second transparent electrodes 121 are formed of a transparent conductive material, such as ITO (Indium Tin Oxide), $SnO_2$, or ZnO, by, for example, sputtering or vapor deposition. Examples of the transparent conductive material include a metal nanowire, typically, a silver nanowire, a thin metal sheet formed into a mesh shape, and a conductive polymer in addition to ITO, $SnO_2$, and ZnO. The first transparent electrodes 111 and the second transparent electrodes 121 may be formed by screen printing using a conductive ink.

Alternatively, the first transparent electrodes 111 and the second transparent electrodes 121 may be formed by using a photoconductive sheet (a sheet formed of a dry film resist having a conductive layer). When such a photoconductive sheet is used, the first transparent electrodes 111 and the second transparent electrodes 121 can be formed in a highly productive manner by bonding this sheet and performing exposure and development.

To each of the plurality of first electrodes 11, a lead wire 11a, which externally extends from the detection area S, is connected, as illustrated in FIG. 1. To each of the plurality of second electrodes 12, a lead wire 12a, which externally extends from the detection area S, is connected. To each first electrode 11, a drive voltage is applied via the lead wire 11a. To each second electrode 12, a drive voltage is applied via the lead wire 12a. The lead wires 11a and the lead wires 12a may be formed of a transparent conductive material similar to that used for the first transparent electrodes 111 and the second transparent electrodes 121 by, for example, sputtering or vapor deposition. The lead wires 11a and the lead wires 12a need not have light transparency, and therefore, may be formed of another metallic material.

As illustrated in FIG. 3 to FIG. 6, the first electrode 11 and the second electrode 12 cross each other at a position where two adjacent first transparent electrodes 111 are coupled to each other and at a position where two adjacent second transparent electrodes 121 are coupled to each other. In this portion of crossing, the bridge wiring member 20 is provided so that the first electrode 11 and the second electrode 12 do not come into contact with each other in the portion of crossing. That is, the capacitive sensor 1 according to the present embodiment has a bridge structure (electrode-crossing structure).

In the flat portion 170 of the capacitive sensor 1 according to the present embodiment, a coupling member 122 is provided between two adjacent second transparent electrodes 121, as illustrated in FIG. 5 and FIG. 6. The coupling member 122 is provided integrally with the second transparent electrodes 121. Therefore, the second electrode 12 is formed such that the second transparent electrode 121 and the coupling member 122 are alternately and repeatedly disposed in the Y direction. The coupling member 122 electrically connects the second transparent electrodes 121 to each other.

Meanwhile, in the flat portion 170 of the capacitive sensor 1 according to the present embodiment, the bridge wiring member 20 is provided between two adjacent first transparent electrodes 111. The bridge wiring member 20 is provided separately from the first transparent electrodes 111 in a portion where the bridge wiring member 20 crosses the coupling member 122. Therefore, the first electrode 11 is formed such that the first transparent electrode 111 and the bridge wiring member 20 are alternately and repeatedly disposed in the X direction. The bridge wiring member 20 illustrated in FIG. 5 extends in the X direction. However, in the capacitive sensor 1 according to the present embodiment, the direction in which the coupling members extend and the direction in which the bridge wiring members 20 extend do not remain the same throughout the detection area S. The pattern of the coupling members and the bridge wiring members 20 in the bending portion 160 of the capacitive sensor 1 according to the present embodiment will be described in detail below.

On the surface of the coupling member 122, an insulating layer 30 is formed. As illustrated in FIG. 6, the space between the coupling member 122 and each first transparent electrode 111 is filled with the insulating layer 30, and the insulating layer 30 runs onto the surfaces of the first transparent electrodes 111 to some extent. As the insulating layer 30, for example, a novolac resin (resist) is used.

As illustrated in FIG. 6, the bridge wiring member 20 is formed so as to extend from a surface 30a of the insulating layer 30 to the surfaces of the respective first transparent electrodes 111 located on the respective sides of the insulating layer 30. The bridge wiring member 20 electrically connects the first transparent electrodes 111 to each other.

As illustrated in FIG. 6, the insulating layer 30 is provided on the surface of the coupling member 122, which connects the second transparent electrodes 121 to each other, and the bridge wiring member 20, which connects the first transparent electrodes 111 to each other, is provided on the surface of the insulating layer 30. As described above, the insulating layer 30 is interposed between the coupling member 122 and the bridge wiring member 20 to create a state where the first transparent electrodes 111 are electrically insulated from the second transparent electrodes 121. In the present embodiment, the first transparent electrodes 111 and the second transparent electrodes 121 can be formed on the same surface (the surface 10a of the substrate 10) to make the capacitive sensor 1 thinner.

All the coupling members 122, the insulating layer 30, and the bridge wiring members 20 are located within the detection area S and have light transparency similarly to the first transparent electrodes 111 and the second transparent electrodes 121.

The protective layer 50 is provided above the bridge wiring members 20 with the optical clear adhesive layer 35 therebetween. The protective layer 50 is bonded to the substrate 10 with the optical clear adhesive layer 35 therebetween. The material of the protective layer 50 is not limited to a specific material. As the material of the protective layer 50, a glass base or a plastic base, specifically, a plastic film, is preferably used. The optical clear adhesive layer 35 is, for example, an acrylic adhesive or a two-sided adhesive tape.

In the capacitive sensor 1 illustrated in FIG. 1, when a finger F comes into contact with an operation surface 50a of the protective layer 50, as illustrated in FIG. 6, a capacitance is formed between the finger F and the first transparent electrode 111 that is close to the finger F and between the finger F and the second transparent electrode 121 that is close to the finger F. On the basis of changes in the capacitances at this time, the capacitive sensor 1 can calculate the position at which the finger F comes into contact. The capacitive sensor 1 determines the Y coordinate of the position of the finger F on the basis of a change in the capacitance between the finger F and the first electrode 11 and determines the X coordinate of the position of the finger F on the basis of a change in the capacitance between the finger F and the second electrode 12 (self-capacitance detection type).

Alternatively, the capacitive sensor 1 may be of a mutual-capacitance detection type. That is, the capacitive sensor 1 may apply a drive voltage to one electrode among one first electrode 11 and one second electrode 12 and sense a change in the capacitance between the finger F and the other electrode among the first electrode 11 and the second electrode 12. Accordingly, the capacitive sensor 1 determines the Y coordinate of the position of the finger F from the other electrode and determines the X coordinate of the position of the finger F from the one electrode.

As described above, the capacitive sensor 1 has the bending portion 160 and the flat portion 170 and is bendable. That is, the capacitive sensor 1 has flexibility.

When the capacitive sensor 1 is bent, the bending portion 160 of the capacitive sensor 1 is subjected to bending stress. In a case where the capacitive sensor 1 is used for, for example, a terminal device having a display screen that is bendable (that is, a foldable terminal device), the bending portion 160 is repeatedly subjected to bending stress. Then, damage, such as a crack, may occur in a bridge wiring member, and the resistance of the bridge wiring member may change accordingly. When the resistance of the bridge wiring member changes, the sensor function of the capacitive sensor may be affected.

To address this issue, in the bending portion 160 of the capacitive sensor 1 according to the present embodiment, a coupling member 112 is provided between two adjacent first transparent electrodes 111, as illustrated in FIG. 3 and FIG. 4. The coupling member 112 is provided integrally with the first transparent electrodes 111. Therefore, the first electrode 11 is formed such that the first transparent electrode 111 and the coupling member 112 are alternately and repeatedly disposed in the X direction. The coupling member 112 electrically connects the first transparent electrodes 111 to each other.

Meanwhile, in the bending portion 160 of the capacitive sensor 1 according to the present embodiment, the bridge wiring member 20 is provided between two adjacent second transparent electrodes 121. The bridge wiring member 20 is provided separately from the second transparent electrodes 121 in a portion where the bridge wiring member 20 crosses the coupling member 112. Therefore, the second electrode 12 is formed such that the second transparent electrode 121 and the bridge wiring member 20 are alternately and repeatedly disposed in the Y direction. The bridge wiring member 20 illustrated in FIG. 3 extends in the Y direction.

On the surface of the coupling member 112, the insulating layer 30 is formed. As illustrated in FIG. 4, the space between the coupling member 112 and each second transparent electrode 121 is filled with the insulating layer 30, and the insulating layer 30 runs onto the surfaces of the second transparent electrodes 121 to some extent. As the insulating layer 30, for example, a novolac resin (resist) is used.

As illustrated in FIG. 4, the bridge wiring member 20 is formed so as to extend from the surface 30a of the insulating layer 30 to the surfaces of the respective second transparent electrodes 121 located on the respective sides of the insulating layer 30. The bridge wiring member 20 electrically connects the second transparent electrodes 121 to each other. The structure of the remaining portion in the bending portion 160 is the same as that in the flat portion 170.

As described above, in the flat portion 170 of the capacitive sensor 1, the coupling members 122 are provided integrally with the plurality of second transparent electrodes 121 to electrically connect the plurality of second transparent electrodes 121 to each other. The bridge wiring members 20 are provided separately from the plurality of first transparent electrodes 111 in respective portions, in each of which the bridge wiring member 20 crosses the coupling member 122, to electrically connect the plurality of first transparent electrodes 111 to each other.

Meanwhile, in the bending portion 160 of the capacitive sensor 1, the coupling members 112 are provided integrally with the plurality of first transparent electrodes 111 to electrically connect the plurality of first transparent electrodes 111 to each other. The bridge wiring members 20 are provided separately from the plurality of second transparent electrodes 121 in respective portions, in each of which the bridge wiring member 20 crosses the coupling member 112, to electrically connect the plurality of second transparent electrodes 121 to each other.

Therefore, in the capacitive sensor 1 according to the present embodiment, the direction in which the coupling members 112 extend in the bending portion 160 is different from the direction in which the coupling members 122 extend in the flat portion 170. Specifically, the directions are orthogonal to each other.

Figure 7:
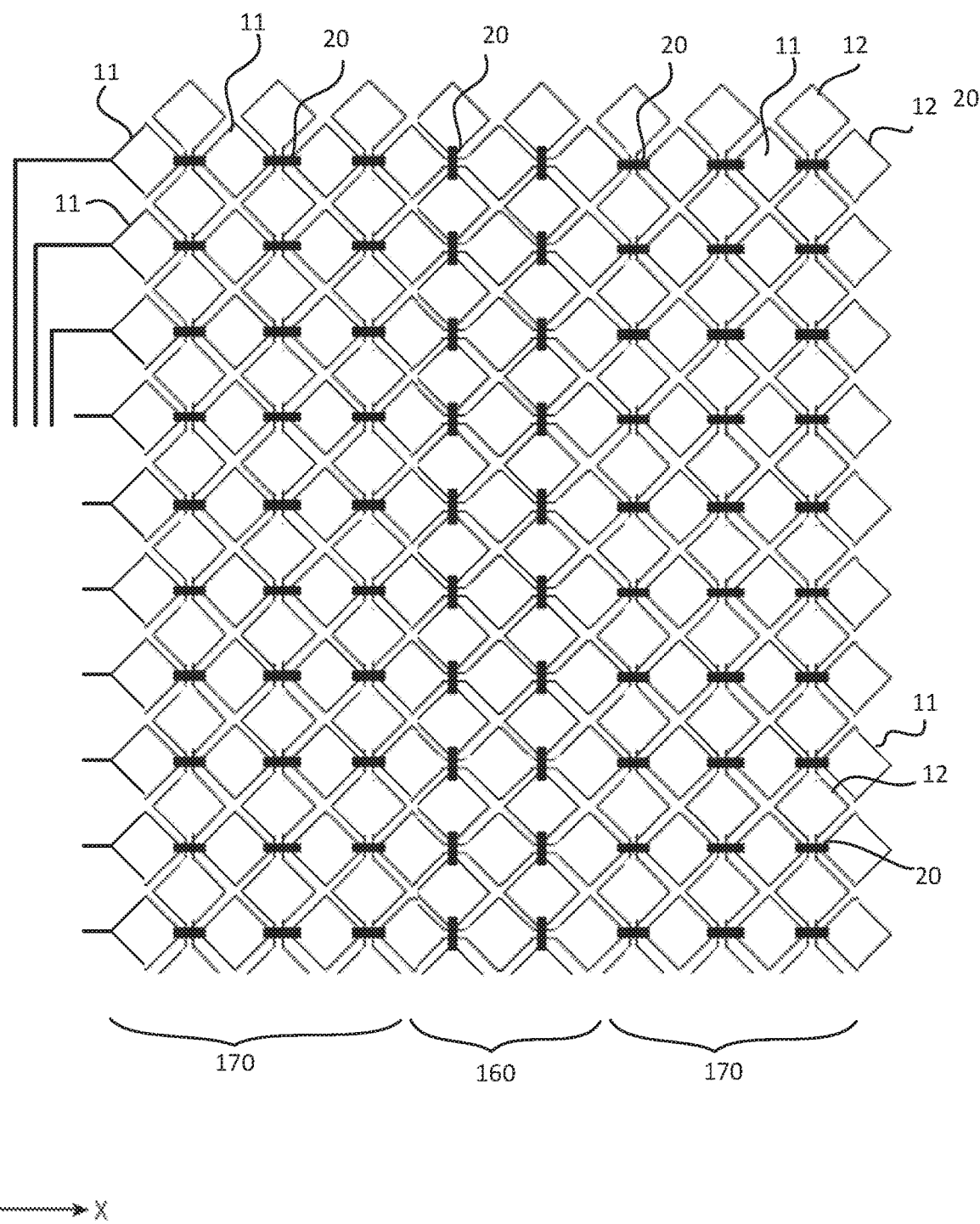
FIG. 7 is a schematic plan view enlarged view illustrating an arrangement of the electrodes and the bridge wiring member another bridge structure in the bending portion and the flat portion.

Accordingly, as shown in FIG. 7, the direction in which the bridge wiring members 20 extend in the bending portion 160 is different from the direction in which the bridge wiring members 20 extend in the flat portion 170. That is, the direction in which the bridge wiring members 20 extend in the bending portion 160 crosses the direction in which the bridge wiring members 20 extend in the flat portion 170. Specifically, the directions are orthogonal to each other. Therefore, as illustrated in FIG. 3 and FIG. 7, the direction in which the bridge wiring member 20 extends in the bending portion 160 is orthogonal to the direction of bending stress to which the bending portion 160 is subjected (in the present embodiment, the X direction). It should be noted that in FIG. 7, the insulating layers 30 are omitted for simplicity of the drawing. Also, the respective numbers of the first electrodes 11, the second electrodes 12, and the bridge wiring members 20 are not limited to that shown in FIG. 7 which illustrates an illustrative example.

The term "direction of bending stress" used herein indicates a direction parallel to the direction of tensile stress and compressive stress to which the capacitive sensor is subjected due to a bending moment produced in the capacitive sensor.

In the capacitive sensor 1 according to the present embodiment, the direction in which the bridge wiring members 20 extend in the bending portion 160 is orthogonal to the direction of bending stress to which the bending portion 160 is subjected, and therefore, the bending resistance of the capacitive sensor 1 can be increased. As a result, even in a case where the capacitive sensor 1 is bendable, the possibility of damage, such as a crack, occurring in the bridge wiring members 20 can be reduced. Accordingly, changes in the resistances of the bridge wiring members 20 can be suppressed, and the possibility of the sensor function of the capacitive sensor 1 being affected can be reduced.

The bending resistance of the capacitive sensor 1 is increased, and therefore, the capacitive sensor 1 can be bent with a smaller radius of curvature, and reliability can be increased.

It is more preferable that the angle between the direction in which the bridge wiring members 20 extend in the bending portion 160 and the direction of bending stress to which the bending portion 160 is subjected be about 90°±30°.

Now, other bridge structures are described with reference to the drawings.

Figure 8A:
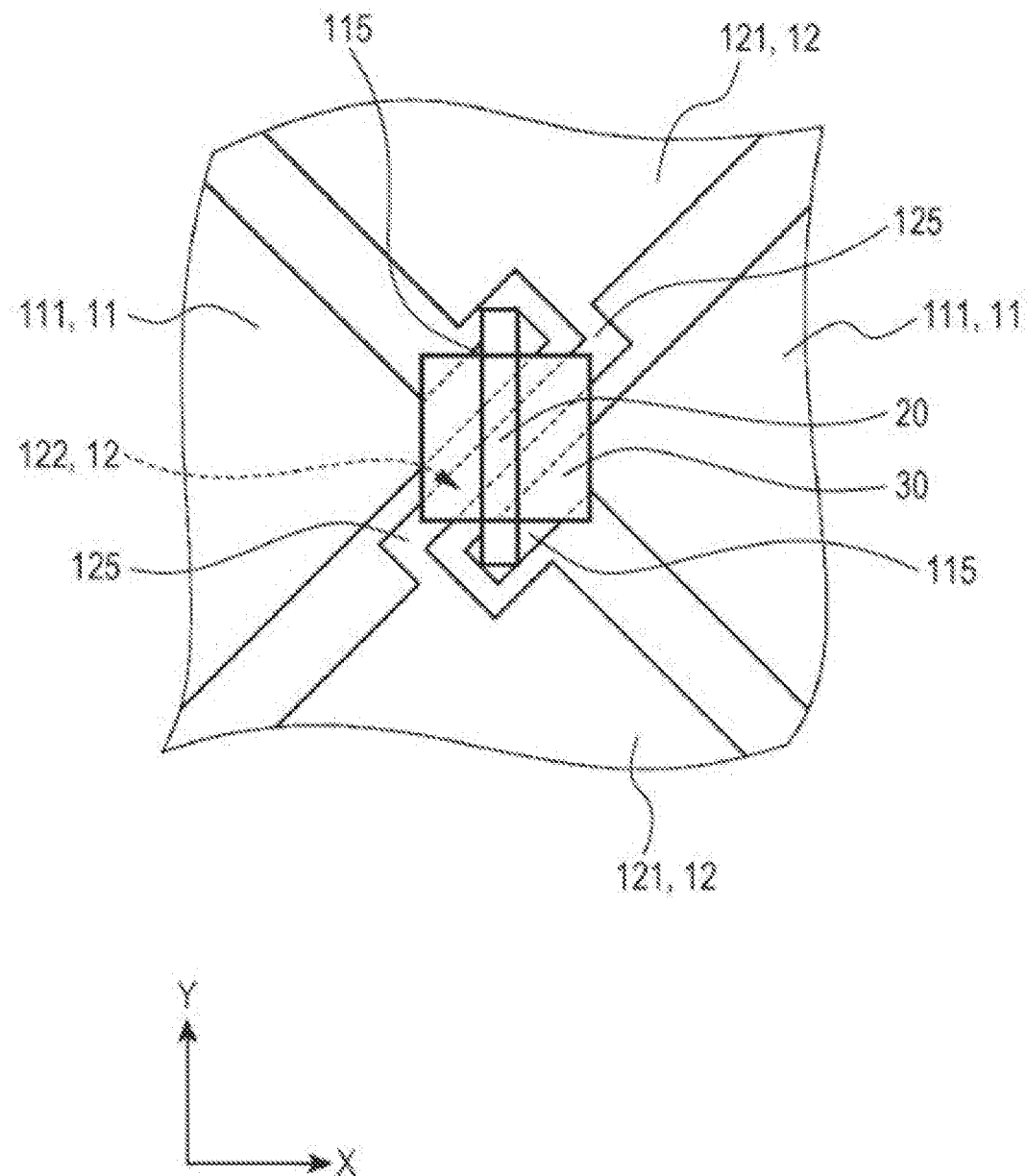
FIGS. 8A and 8B are a schematic enlarged views illustrating another bridge structure in the bending portion and the flat portion, respectively.
Figure 8B:
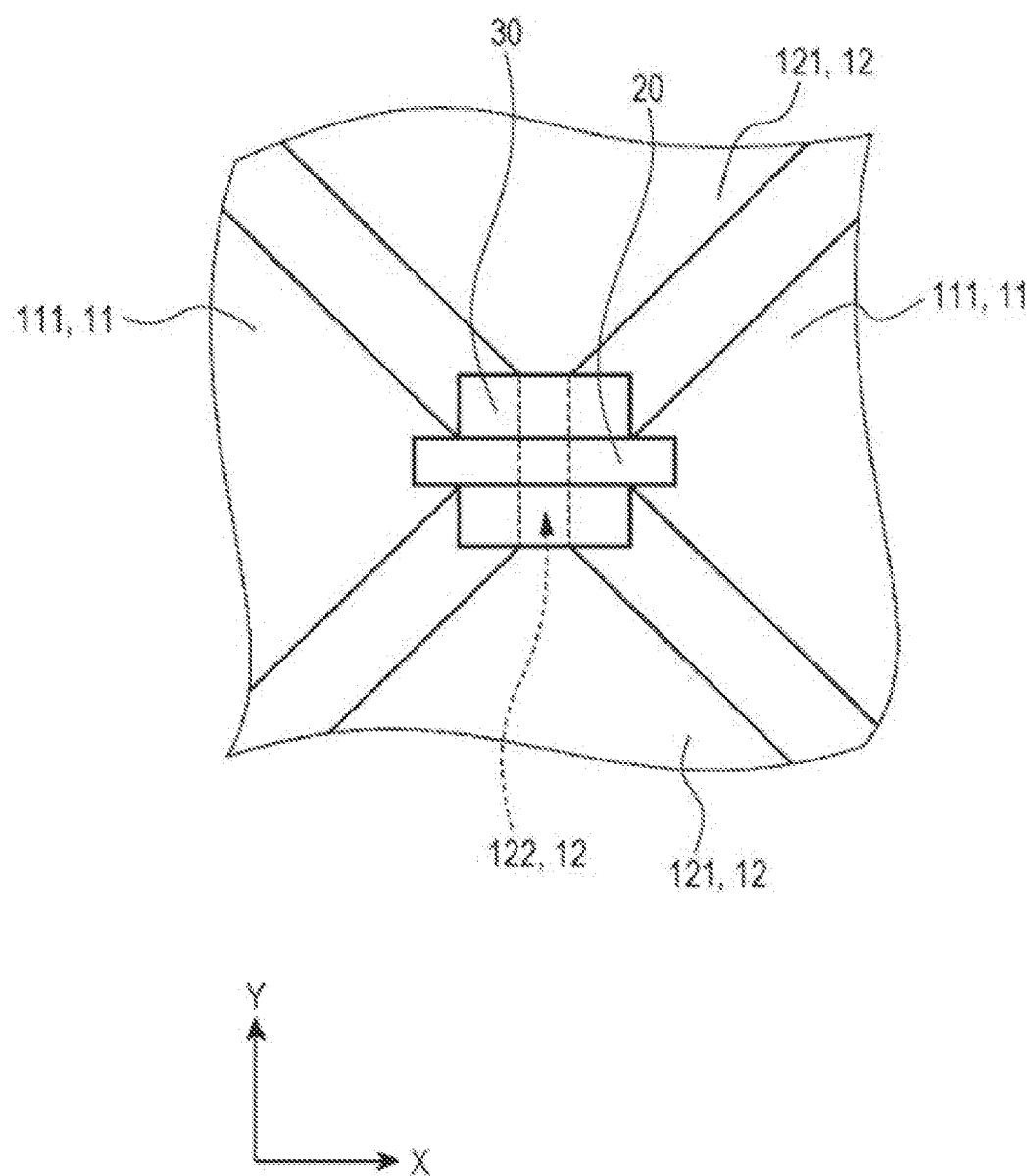
Figure 8C:
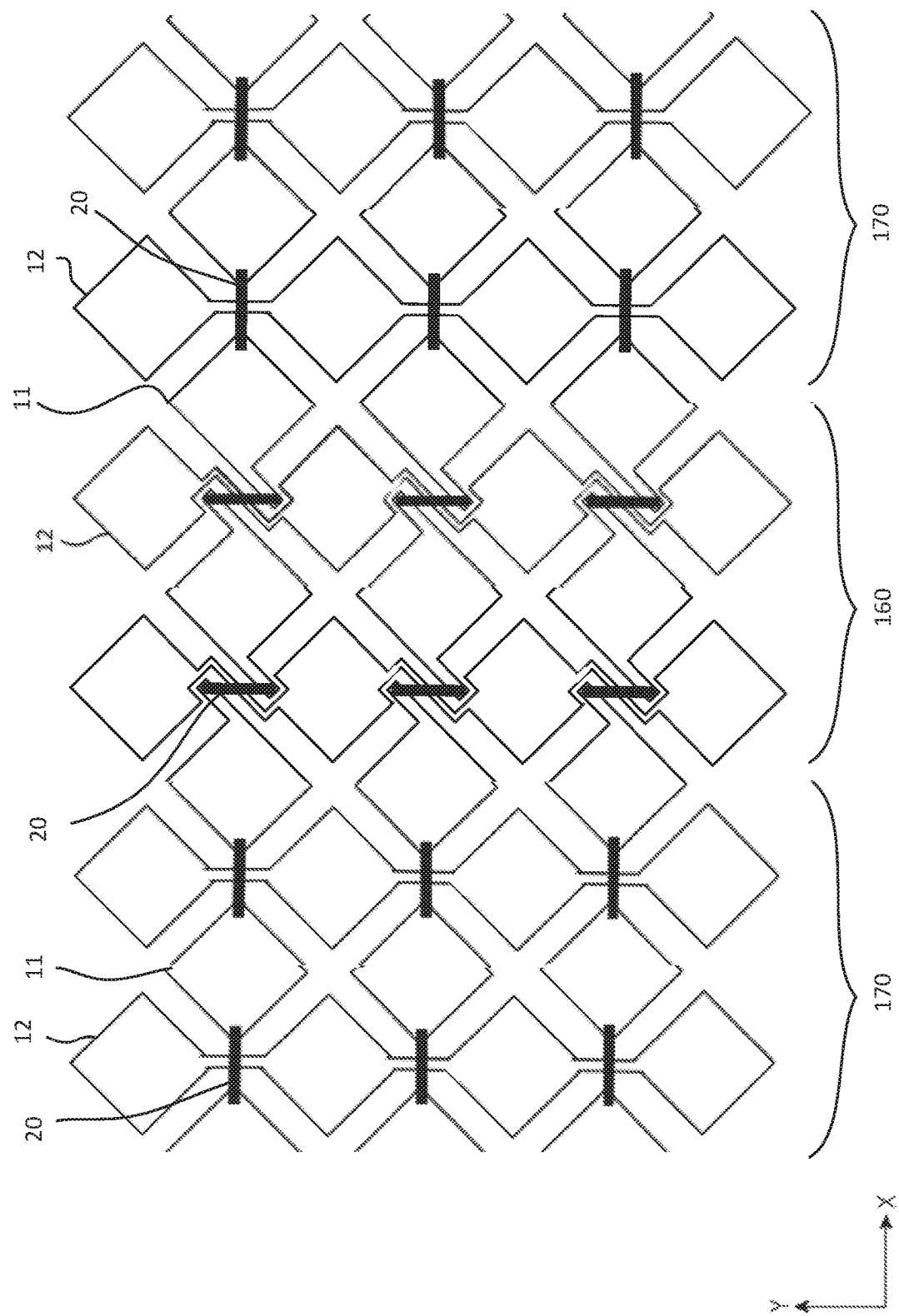
FIG. 8C is a schematic partial plan view illustrating an arrangement of the electrodes and the bridge wiring members in the flat portion and the bending portion.

FIG. 8A is a schematic enlarged view illustrating another bridge structure in the bending portion. FIG. 8B is a schematic enlarged view illustrating another bridge structure in the flat portion. FIG. 8C is a schematic partial plan view illustrating an arrangement of the electrodes and the bridge wiring members in the bending portion 160 and the flat portion 170.

As illustrated in FIG. 8B, in the flat portion 170 of the capacitive sensor 1, the first transparent electrodes 111 have a rhombus shape. The second transparent electrodes 121 have a rhombus shape, and one of the adjacent second transparent electrodes 121 is connected to the other second transparent electrode 121 via the coupling member 122. The bridge wiring member 20 is connected to end portions of the rhombus shapes of the first transparent electrodes 111 and extends in the X direction.

Meanwhile, as illustrated in FIG. 8A, in the bending portion 160 of the capacitive sensor 1, the first transparent electrodes 111 have a substantially rhombus shape and each have an extending portion 115, which extends outward from the rhombus portion. The extending portion 115 extends in a direction at about 45° relative to the X direction (that is, the direction of bending stress). The bridge wiring member 20 is connected to end portions of the extending portions 115 of the first transparent electrodes 111 and extends in the Y direction.

As described above, in the bridge structures illustrated in FIG. 8A and FIG. 8B, the direction (Y direction) in which the bridge wiring member 20 extends in the bending portion 160 crosses the direction (X direction) in which the bridge wiring member 20 extends in the flat portion 170. Specifically, the directions are orthogonal to each other. Such an arrangement of the bridge wiring members 20 is illustrated in FIG. 8C. It should be noted that the insulating layers 30 are omitted in FIG. 8C for simplicity of the drawing. Also, the respective numbers of the first electrodes 11, the second electrodes 12, and the bridge wiring members 20 are not limited to that shown in FIG. 8C which illustrates an illustrative example.

In the bending portion 160 of the capacitive sensor 1, the second transparent electrodes 121 have a substantially rhombus shape and each have an extending portion 125, which extends outward from the rhombus portion. The extending portion 125 is connected to the coupling member 122. That is, in this specific example, two adjacent second transparent electrodes 121 are connected to each other via the respective extending portions 125 and the coupling member 122. The coupling member 122 extends through the space between the extending portions 115 of the respective first transparent electrodes 111.

In the above-described structures, the connection relation of the plurality of first transparent electrodes 111 being electrically connected to each other via the bridge wiring members 20 and the connection relation of the plurality of second transparent electrodes 121 being electrically connected to each other via the coupling members 122 in the bending portion 160 remain the same in the flat portion 170. The direction in which the coupling members 122 extend and the direction in which the bridge wiring members 20 extend in the bending portion 160 can be made different from those in the flat portion 170. Therefore, the possibility of damage, such as a crack, occurring in the bridge wiring members 20 can be reduced and the possibility of the sensor function of the capacitive sensor 1 being affected can be reduced without making the connection relation of the plurality of first transparent electrodes 111 and the connection relation of the plurality of second transparent electrodes 121 in the bending portion 160 and those in the flat portion 170 different from each other. Further, the direction in which the bridge wiring members 20 extend in the bending portion 160 is made different from the direction in which the bridge wiring members 20 extend in the flat portion 170. Therefore, even in a case where the capacitive sensor 1 is used for, for example, a terminal device, the possibility of the pattern of the bridge wiring members 20 being visible from outside the terminal device can be reduced.

Now, an example of a bending-resistance evaluation test conducted by the present inventor is described with reference to the drawings.

Figure 9:
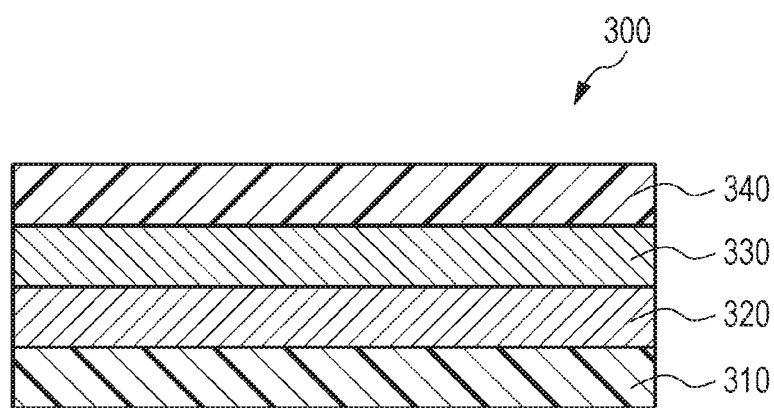
FIG. 9 is a schematic cross-sectional view illustrating a sample used in a bending-resistance evaluation test.
Figure 10:
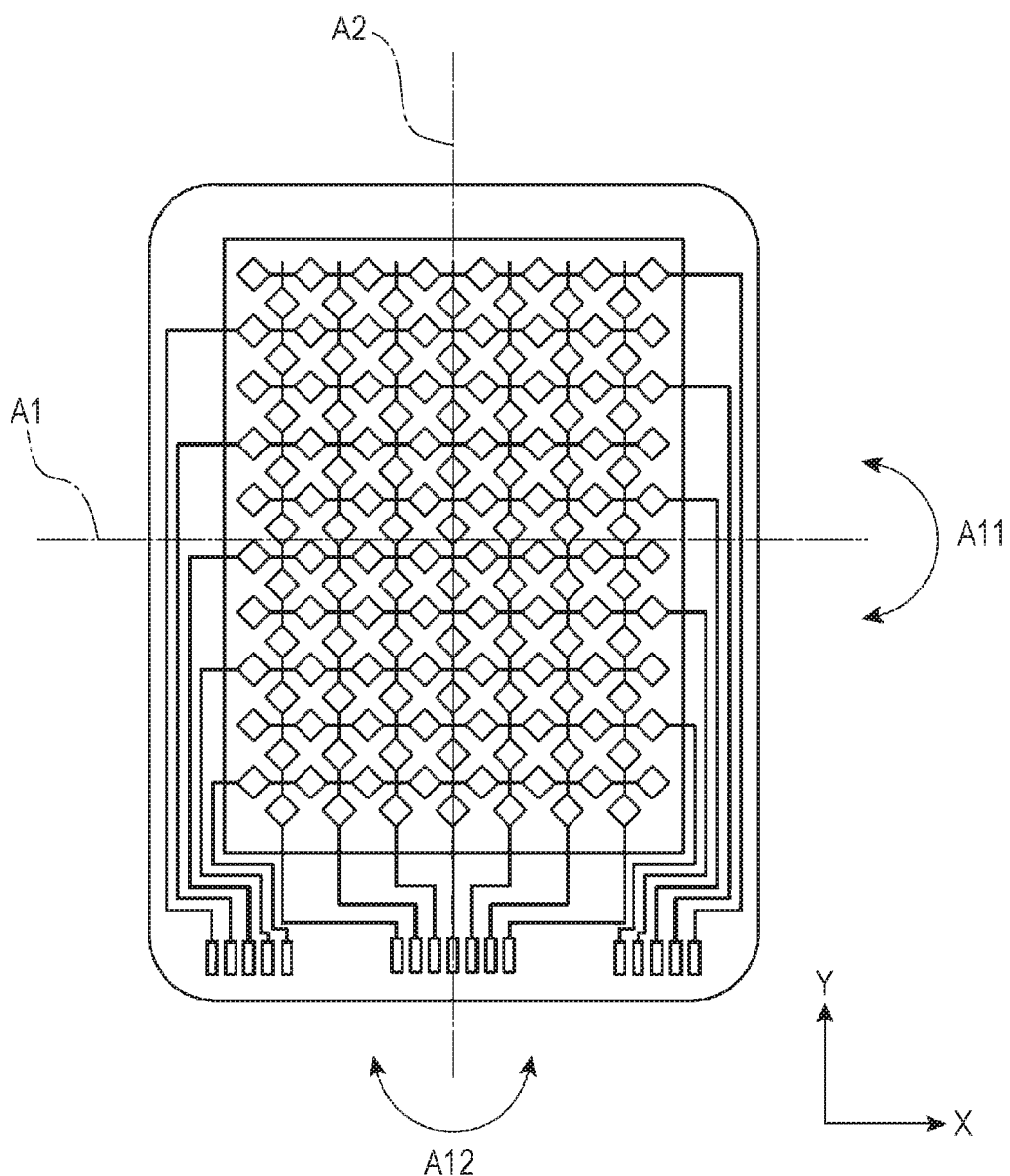
FIG. 10 is a schematic plan view illustrating directions of bending in the test.
Figure 11:
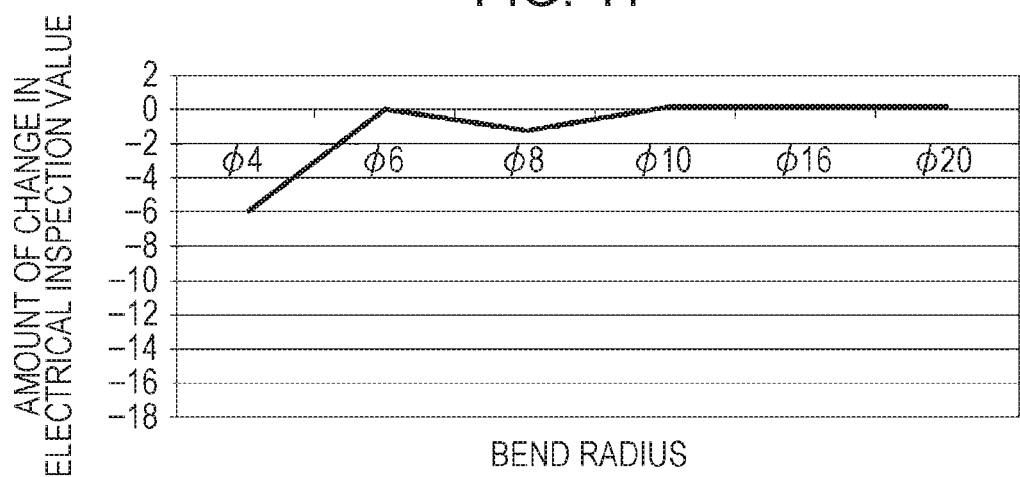
FIG. 11 is a graph illustrating an example of the result of the test.
Figure 12:
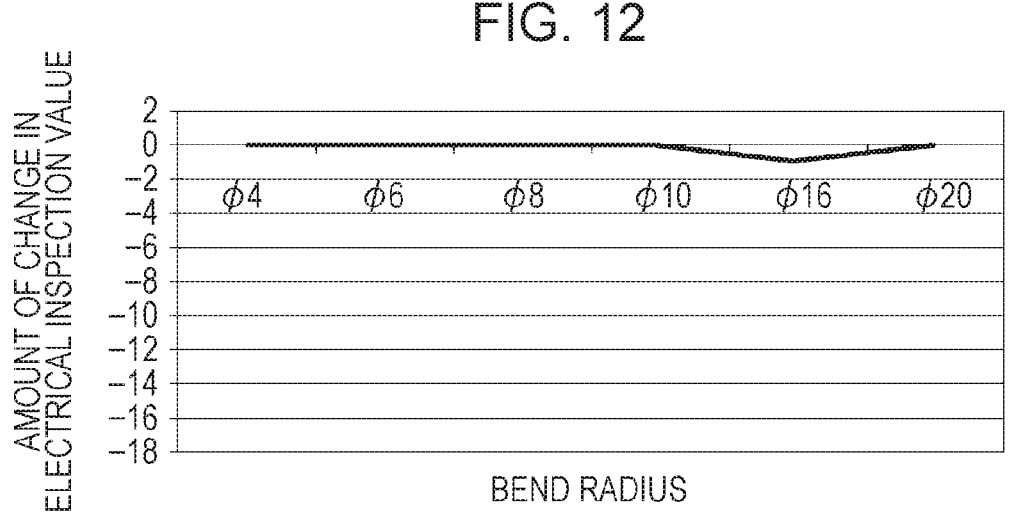
FIG. 12 is a graph illustrating another example of the result of the test.

FIG. 9 is a schematic cross-sectional view illustrating a sample used in the bending-resistance evaluation test. FIG. 10 is a schematic plan view illustrating directions of bending in the test. FIG. 11 is a graph illustrating an example of the result of the test. FIG. 12 is a graph illustrating another example of the result of the test.

The present inventor conducted the bending-resistance evaluation test using the sample illustrated in FIG. 9 and a mandrel bending tester. As illustrated in FIG. 9, a sample 300 used in the test has a first protective layer 310, a sensor unit 320, a reinforcing sheet 330, and a second protective layer 340. The first protective layer 310, the sensor unit 320, the reinforcing sheet 330, and the second protective layer 340 are stacked in this order.

The sensor unit 320 has a structure in which, for example, a circuit that includes the first transparent electrodes 111 and the second transparent electrodes 121 is formed on a film-like transparent base made of polyethylene terephthalate (PET). In the sample 300, two adjacent first transparent electrodes 111 are electrically connected to each other via the bridge wiring member 20, and two adjacent second transparent electrodes 121 are electrically connected to each other via the coupling member 122.

The reinforcing sheet 330 is formed of polyethylene terephthalate. The reinforcing sheet 330 is bonded onto the sensor unit 320 with an optical clear adhesive layer therebetween.

On either surface of a stacked assembly formed of the sensor unit 320 and the reinforcing sheet 330, a protective layer is provided. Specifically, the first protective layer 310 is provided under the sensor unit 320, and the second protective layer 340 is provided over the reinforcing sheet 330. The first protective layer 310 and the second protective layer 340 each has a base formed of polyethylene terephthalate and an optical clear adhesive layer formed of an acrylic adhesive layer. The first protective layer 310 is bonded to the sensor unit 320 with the optical clear adhesive layer formed of an acrylic adhesive layer. The second protective layer 340 is bonded to the reinforcing sheet 330 with the optical clear adhesive layer formed of an acrylic adhesive layer.

The present inventor used the above-described sample illustrated in FIG. 9 to conduct the bending-resistance evaluation test using a mandrel bending tester.

The bridge wiring members 20 provided in the sensor unit 320 of a first sample extend in a direction parallel to the first axis A1 illustrated in FIG. 10. The first sample was bent in the direction indicated by the arrow A12 illustrated in FIG. 10 along the second axis A2, which is orthogonal to the first axis A1. Therefore, the direction in which the bridge wiring members 20 extend is orthogonal to the second axis A2 of the direction of bending.

Also, the bridge wiring members 20 provided in the sensor unit 320 of a second sample extend in the direction parallel to the first axis A1 illustrated in FIG. 10. The second sample was bent in the direction indicated by the arrow A11 illustrated in FIG. 10 along the first axis A1. Therefore, the direction in which the bridge wiring members 20 extend is parallel to the first axis A1 of the direction of bending.

The first sample was bent once in the direction indicated by the arrow A12 along the second axis A2. The second sample was bent once in the direction indicated by the arrow A11 along the first axis A1. Then, changes in an electrical inspection value (CX), that is, changes from a value before application of the load to a value after application of the load, are checked. Note that "CX" is a correction value of the capacitance of the sensor unit 320. The bend radius is set to $\phi 20$, $\phi 16$, $\phi 10$, $\phi 8$, $\phi 6$, and $\phi 4$. The axes of bending are the second axis A2 and the first axis A1 as described above.

An example of the result of testing the first sample is illustrated in FIG. 11. Based on the present inventor's experiences, the acceptable range of the amount of change in the electrical inspection value, that is, changes from a value before the test to a value after the test, is "within ±2". Accordingly, regarding the first sample, in a case where the bend radius is $\phi 6$ or more, the possibility of damage, such as a crack, occurring in the bridge wiring members 20 can be reduced and the possibility of the sensor function of the sensor unit 320 being affected can be reduced.

An example of the result of testing the second sample is illustrated in FIG. 12. The acceptable range of the amount of change in the electrical inspection value, that is, changes from a value before the test to a value after the test, is "within ±2" as in the case of the first sample. Accordingly, regarding the second sample, in a case where the bend radius is $\phi 4$ or more, the possibility of damage, such as a crack, occurring in the bridge wiring members 20 can be reduced and the possibility of the sensor function of the sensor unit 320 being affected can be reduced.

Based on the result of the bending-resistance evaluation test conducted for the first sample and for the second sample, it is found that the bridge wiring members 20 are damaged to a smaller degree in the second sample than in the first sample even if the bend radius of the second sample is decreased. That is, it is found that, in the case where the direction in which the bridge wiring members 20 extend is parallel to the axis of the direction of bending, the bridge wiring members 20 are damaged to a smaller degree than in the case where the direction in which the bridge wiring members 20 extend is orthogonal to the axis of the direction of bending. Based on the above-described result, making the direction in which the bridge wiring members 20 extend close to a direction parallel to the axial direction of the curved surface in the bending portion 160 illustrated in FIG. 2 is effective in suppressing damage occurring in the bridge wiring members 20.

The present embodiment and example applications thereof have been described above; however, the present invention is not limited to the examples. For example, an embodiment obtained by a person skilled in the art adding, deleting, or making a design change to any constituent element in the above-described embodiment or example applications thereof as appropriate and an embodiment obtained by a person skilled in the art combining features of the embodiment as appropriate are within the scope of the present invention as long as such embodiments have the spirit of the present invention.

What is claimed is:

1. A capacitive sensor having a bending portion and a flat portion and bendable in the bending portion, the capacitive sensor comprising:
   a flexible substrate having a detection area defined thereon;
   a plurality of first electrodes having light transparency and provided in the detection area, the plurality of first electrodes extending in a first direction and being arranged side by side in a second direction crossing the first direction, each first electrode including a plurality of first transparent electrodes arranged in the first direction and electrically connected to one another, each first transparent electrode having a rhombus shape;
   a plurality of second electrodes having light transparency and provided in the detection area, the plurality of second electrodes extending in the second direction and being arranged side by side in the first direction, each second electrode including a plurality of second transparent electrodes arranged in the second direction and electrically connected to one another;
   a coupling member provided to two adjacent second transparent electrodes among the plurality of second transparent electrodes, the coupling member being integrally formed with the two adjacent second transparent electrodes so as to electrically connect the two adjacent second transparent electrodes; and
   a bridge wiring member provided to the two adjacent first transparent electrodes to which the coupling member is not provided, the bridge wiring member crossing over the coupling member so as to electrically connect the two adjacent first transparent electrodes to which the bridge wiring member is provided,
   wherein the capacitive sensor has a first area corresponding to the flat portion of the panel and a second area corresponding to the bending portion of the panel,
   wherein the coupling member is provided to the two adjacent second transparent electrodes in the plurality of second electrodes such that a direction in which the coupling member extends in the second area is different from a direction in which the coupling member extends in the first area,
   wherein the two adjacent first transparent electrodes in the second area each has an extending portion extending from an end portion of the rhombus shape such that the extending portions of the two adjacent first transparent electrodes face each other, the bridge wiring member in the second area connecting respective end portions of the extending portions of the two adjacent first transparent electrodes so as to extend in a direction orthogonal to the first direction,
   and wherein the bridge wiring member in the first area connects respective corner portions of the rhombus shape of the two adjacent first transparent electrodes so as to extend in the first direction.

2. The capacitive sensor according to claim 1, wherein the direction in which the coupling member extends in the second area is oblique to the direction in which the coupling member extends in the first area.

3. The capacitive sensor according to claim 1, wherein the bridge wiring member provided in the second area extends in a direction crossing a direction of bending stress.

4. The capacitive sensor according to claim 1, wherein the capacitive sensor is bendable along an axis in the second area, and the bridge wiring member provided in the second area extends in a direction parallel to the axis.

5. The capacitive sensor according to claim 1, wherein in the second area, the second transparent electrodes and the bridge wiring members are alternately and repeatedly disposed such that the bridge wiring members extend in the direction orthogonal to the first direction.

* * * * *